US007761478B2

(12) United States Patent
Akkiraju et al.

(10) Patent No.: US 7,761,478 B2
(45) Date of Patent: Jul. 20, 2010

(54) SEMANTIC BUSINESS MODEL MANAGEMENT

(75) Inventors: Rama K. T. Akkiraju, Yorktown Heights, NY (US); Anca-Andreea Ivan, New Rochelle, NY (US); Juhnyoung Lee, Yorktown Heights, NY (US); Grace Y. Lin, Chappaqua, NY (US); Timur Nurullaev, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/286,609

(22) Filed: Nov. 23, 2005

(65) Prior Publication Data

US 2007/0118551 A1    May 24, 2007

(51) Int. Cl.
*G06F 7/00* (2006.01)
(52) U.S. Cl. .................. 707/803; 707/810; 706/45; 715/234
(58) Field of Classification Search .............. 707/3, 707/102; 706/45; 715/234
See application file for complete search history.

(56) References Cited

U.S. PATENT DOCUMENTS

| 4,591,983 | A | 5/1986 | Bennett et al. |
|---|---|---|---|
| 5,233,513 | A | 8/1993 | Doyle |
| 5,303,297 | A | 4/1994 | Hillis |
| 5,784,696 | A | 7/1998 | Melnikoff |
| 5,819,086 | A | 10/1998 | Kroenke |
| 5,822,736 | A | 10/1998 | Hartman et al. |
| 5,890,133 | A | 3/1999 | Ernst |
| 5,918,209 | A | 6/1999 | Campbell et al. |
| 5,926,817 | A | 7/1999 | Christeson et al. |
| 5,930,512 | A | 7/1999 | Boden et al. |
| 5,966,700 | A | 10/1999 | Gould et al. |
| 6,011,917 | A | 1/2000 | Leymann et al. |
| 6,028,997 | A | 2/2000 | Leymann et al. |
| 6,038,538 | A | 3/2000 | Agrawal et al. |
| 6,115,691 | A | 9/2000 | Ulwick |
| 6,247,008 | B1 | 6/2001 | Cambot et al. |

(Continued)

FOREIGN PATENT DOCUMENTS

JP    2001297003    10/2001

(Continued)

OTHER PUBLICATIONS

Almgren et al., "Optimal Portfolios from Ordering Information", Dec. 10, 2004, 62 pages.

(Continued)

*Primary Examiner*—Khanh B Pham
*Assistant Examiner*—Jieying Tang
(74) *Attorney, Agent, or Firm*—William Schiesser; Hoffman Warnick LLC (57) ABSTRACT

A computer-implemented solution for managing a semantic business model is provided. In particular, one or more business area models for a business entity are obtained and transformed into intermediate model(s). Each intermediate model is represented using a substantially similar meta-modeling language. Subsequently, the semantic business model is generated by merging the set of intermediate models. In this manner, the semantic business model can be generated in a manner that reduces the overall burden on a user. The semantic business model can be provided for display to the user and/or use in performing qualitative analysis on various aspects of the business entity.

33 Claims, 5 Drawing Sheets

U.S. PATENT DOCUMENTS

| | | | |
|---|---|---|---|
| 6,405,179 B1 | 6/2002 | Rebane | |
| 6,526,387 B1 | 2/2003 | Ruffin et al. | |
| 6,535,591 B1 | 3/2003 | Galich et al. | |
| 6,539,396 B1* | 3/2003 | Bowman-Amuah | 707/103 R |
| 6,553,350 B2 | 4/2003 | Carter | |
| 6,601,233 B1 | 7/2003 | Underwood | |
| 6,662,188 B1 | 12/2003 | Rasmussen et al. | |
| 6,662,355 B1 | 12/2003 | Caswell et al. | |
| 6,665,648 B2 | 12/2003 | Brodersen et al. | |
| 6,684,400 B1 | 1/2004 | Goode et al. | |
| 6,703,934 B1 | 3/2004 | Nijman et al. | |
| 6,757,667 B1 | 6/2004 | Patel | |
| 6,857,020 B1 | 2/2005 | Chaar et al. | |
| 6,862,580 B1 | 3/2005 | Ford | |
| 6,938,001 B2 | 8/2005 | Kimmel, Jr. | |
| 6,963,854 B1 | 11/2005 | Boyd et al. | |
| 7,246,104 B2* | 7/2007 | Stickler | 707/1 |
| 2002/0065696 A1 | 5/2002 | Hack et al. | |
| 2002/0099582 A1 | 7/2002 | Buckley et al. | |
| 2002/0099669 A1 | 7/2002 | Lauer | |
| 2002/0169658 A1 | 11/2002 | Adler | |
| 2003/0023470 A1 | 1/2003 | Labbi | |
| 2003/0135399 A1 | 7/2003 | Ahamparam et al. | |
| 2003/0208429 A1 | 11/2003 | Bennett | |
| 2003/0229526 A1 | 12/2003 | Gallacci et al. | |
| 2004/0006399 A1 | 1/2004 | Klein | |
| 2004/0073441 A1 | 4/2004 | Heyns et al. | |
| 2004/0073442 A1 | 4/2004 | Heyns et al. | |
| 2004/0073467 A1 | 4/2004 | Heyns et al. | |
| 2004/0172319 A1 | 9/2004 | Eder | |
| 2004/0181771 A1 | 9/2004 | Anonsen et al. | |
| 2004/0181775 A1 | 9/2004 | Anonsen et al. | |
| 2004/0225549 A1 | 11/2004 | Parker et al. | |
| 2004/0236591 A1 | 11/2004 | Johnson et al. | |
| 2004/0267601 A1 | 12/2004 | Angley | |
| 2005/0071266 A1 | 3/2005 | Eder | |
| 2005/0108084 A1 | 5/2005 | Ramamoorti et al. | |
| 2005/0137920 A1 | 6/2005 | O'Connor et al. | |
| 2006/0064667 A1* | 3/2006 | Freitas | 717/104 |
| 2006/0242183 A1* | 10/2006 | Niyogi et al. | 707/101 |
| 2007/0168914 A1 | 7/2007 | Reddy | |
| 2007/0180424 A1* | 8/2007 | Kazakov et al. | 717/104 |

FOREIGN PATENT DOCUMENTS

| | | |
|---|---|---|
| JP | 2004227426 | 8/2004 |
| WO | 0231651 A1 | 4/2002 |
| WO | 02060099 A3 | 8/2002 |
| WO | 02069142 A1 | 9/2002 |

OTHER PUBLICATIONS

April et al., "Optfolio—A Simulation Optimization System for Project Portfolio Planning", Proceedings of the 2003 Winter Simulation Conference, pp. 301-309.

Banerjee et al., "The Project Portfolio Management Problem", Jun. 21, 2001, 50 pages.

Dickinson et al., "Technology Portfolio Management: Optimizing Interdependent Projects Over Multiple Time Periods", IEEE Transactions on Engineering Management, vol. 48, No. 4, Nov. 2001, pp. 518-527.

Mike Gruia, "The Efficient Frontier Technique for Analyzing Project Portfolio Management", Dec. 2003, 8 pages.

Gil Makleff, "The Seven Habits of Highly Effective It Portfolio Management (PPM) Implementations", Dec. 2003, 9 pages.

Iwata, S., "A Faster Scaling Algorithm for Minimizing Submodular Functions", SIAM J. COMPUT. (2003), vol. 32, No. 4, pp. 833-840.

Queyranne, M., "Minimizing symmetric submodular functions", Mathematical Programming 82 (1998), pp. 3-12.

Schrijver, A., "A combinatorial algorithm minimizing submodular functions in strongly polynomial time", Journal of Combinatorial Theory, B80, 346-355, 2000, (pp. 1-8 in copy provided).

Bertsimas, D. et al., "Optimal Control of Execution Costs", Journal of Financial Markets, 1, 1-50, 1998 (pp. 1-63 in copy provided).

Fleischer, L. et al., "A push-relabel framework for submodular function minimization and applications to parametric optimization", Discrete Applied Mathematics, 131, 311-322, 2003 (pp. 1-15 in copy provided).

Iwata, S. et al., "A Combinatorial Strongly Polynomial Algorithm for Minimizing Submodular Functions", Journal of the ACM, vol. 48, No. 4, Jul. 2001, pp. 761-777.

Goldfarb, D. et al., "Robust Portfolio Selection Problems", Mathematics of Operations Research, vol. 28, No. 1 (Feb. 2003), pp. 1-38.

Office Action, U.S. Appl. No. 11/200,847, Dated Oct. 29, 2008, 24 pages.

Final Office Action, U.S. Appl. No. 11/200,847, Dated May 7, 2009, 21 pages.

Office Action, U.S. Appl. No. 11/200,847, Dated Oct. 20, 2009, 28 pages.

Office Action, U.S. Appl. No. 11/295,828, Dated Jun. 29, 2009, 15 pages.

Final Office Action, U.S. Appl. No. 111295,828, Dated Nov. 30, 2009, 23 pages.

Kyle V. Davy, "Redesign Your Profits: Value-Based Fee Structure", pp. 1-8, DesignIntelligence, Jul. 26, 2005.

Gartner, "ERP Implementations and Gain Sharing", Department of Defense USA, 16 pages, Oct. 2003.

U.S. Appl. No. 11/373,948, "Office Action", Dated Mar. 4, 2010, 19 pages.

U.S. Appl. No. 11/200,847, Office Action Communication, END920050068US1, Apr. 14, 2010, 36 pages.

U.S. Appl. No. 11/200,727, Office Action Communication, END920050106US1, Apr. 16, 2010, 25 pages.

U.S. Appl. No. 11/295,828, Office Action Communication, END920050109US1, Mar. 26, 2010 27 pages.

* cited by examiner

SEMANTIC BUSINESS MODEL MANAGEMENT

REFERENCE TO RELATED APPLICATION

The current application is related to co-owned U.S. patent application Ser. No. 11/200,847, filed on Aug. 10, 2005, and entitled "Business Solution Evaluation", which is hereby incorporated herein by reference.

FIELD OF THE INVENTION

The invention relates generally to semantic business models, and more particularly, to a solution for generating and/or managing semantic business models.

BACKGROUND OF THE INVENTION

Component business modeling (CBM) is a technique for modeling a business and its corresponding business activities based on "business components". Each business component comprises a relatively independent collection of business activities. CBM provides a simple business view for strategic-level business analysis. CBM differs from traditional business process-based models, which provide a transactional view of the business. In addition, CBM facilitates qualitative analysis techniques, such as dependency analysis (to identify one or more components associated with a business pain point), heat map analysis (also to identify one or more components associated with a business pain point), and overlay analysis (to identify a shortfall, such as an information technology (IT) shortfall, of the identified component(s)).

A semantic business model helps automate the qualitative analyses facilitated by CBM. The semantic business model comprises a representation of the CBM in a semantic markup language, such as the world wide web consortium's (W3C's) resource description framework (RDF) or W3C's OWL web ontology language. The semantic business model captures relationships between various business concepts, such as one or more business components, business processes, business activities, operational metrics, performance indicators, value drivers, IT applications, IT capabilities (systems, services, solutions, . . .), and resources, including human resources. As a result, the semantic business model can be used to discover implicit facts in the analyses using the inference capabilities of an ontology.

To date, semantic business models are manually generated by one or more experts in a particular ontology. For example, the identification of relationships between the various business concepts is done manually. This process is both tedious and error-prone. Further, an individual, such as a business consultant, requires expertise and knowledge in a particular domain (e.g., an industry sector such as the retail industry, the distribution industry, the petroleum industry, etc.). Still further, an individual generating a semantic business model may inadvertently exclude one or more models that may exist for a particular business entity and/or may retype one or more models thereby introducing an additional opportunity for errors.

In view of the foregoing, there exists a need in the art to overcome one or more of the deficiencies indicated herein.

SUMMARY OF THE INVENTION

The invention provides a computer-implemented solution for managing a semantic business model. In particular, one or more business area models for a business entity are obtained and transformed into intermediate model(s). Each intermediate model is represented using a substantially similar meta-modeling language. Subsequently, the semantic business model is generated by merging the set of intermediate models. In this manner, the semantic business model can be generated in a manner that reduces the overall burden (e.g., expertise, knowledge, decision-making, time, and/or the like) on a user, such as a business consultant. Further, the semantic business model can be more detailed and/or comprise a larger scale than those currently generated manually. The semantic business model can be provided for display to a user and/or use in performing qualitative analysis on various aspects of the business entity.

A first aspect of the invention provides a computer-implemented method of generating a semantic business model, the method comprising: obtaining a set of business area models for a business entity; transforming each of the set of business area models into an intermediate model, wherein each intermediate model is represented using a substantially similar meta-modeling language; and merging the set of intermediate models into the semantic business model by: mapping at least one object in a first intermediate model to at least one object in a second intermediate model; adding a mapping object for the mapping to the semantic business model; and adding relationship information for the mapping object to the semantic business model based on the first intermediate model and the second intermediate model.

A second aspect of the invention provides a computerized system for generating a semantic business model, the system comprising: a system for obtaining a set of business area models for a business entity; a system for transforming each of the set of business area models into an intermediate model, wherein each intermediate model is represented using a substantially similar meta-modeling language; and a system for merging the set of intermediate models into the semantic business model, wherein the system for merging includes: a system for mapping at least one object in a first intermediate model to at least one object in a second intermediate model; a system for adding a mapping object for the mapping to the semantic business model; and a system for adding relationship information for the mapping object to the semantic business model based on the first intermediate model and the second intermediate model.

A third aspect of the invention provides a program product stored on a computer-readable medium, which when executed, enables a computer infrastructure to generate a semantic business model, the program product comprising computer program code for enabling the computer infrastructure to: obtain a set of business area models for a business entity; transform each of the set of business area models into an intermediate model, wherein each intermediate model is represented using a substantially similar meta-modeling language; and merge the set of intermediate models into the semantic business model by: mapping at least one object in a first intermediate model to at least one object in a second intermediate model; adding a mapping object for the mapping to the semantic business model; and adding relationship information for the mapping object to the semantic business model based on the first intermediate model and the second intermediate model.

A fourth aspect of the invention provides a computer-implemented method of managing a semantic business model, the method comprising: obtaining a set of business area models for a business entity; transforming each of the set of business area models into an intermediate model, wherein each intermediate model is represented using a substantially similar meta-modeling language; and generating the semantic business model by merging the set of intermediate models.

A fifth aspect of the invention provides a computerized system for managing a semantic business model, the system comprising: a system for obtaining a set of business area models for a business entity; a system for transforming each of the set of business area models into an intermediate model, wherein each intermediate model is represented using a substantially similar meta-modeling language; and a system for generating the semantic business model by merging the set of intermediate models.

A sixth aspect of the invention provides a program product stored on a computer-readable medium, which when executed, enables a computer infrastructure to manage a semantic business model, the program product comprising computer program code for enabling the computer infrastructure to: obtain a set of business area models for a business entity; transform each of the set of business area models into an intermediate model, wherein each intermediate model is represented using a substantially similar meta-modeling language; and generate the semantic business model by merging the set of intermediate models.

A seventh aspect of the invention provides a method of generating a system for managing a semantic business model, the method comprising: providing a computer infrastructure operable to: obtain a set of business area models for a business entity; transform each of the set of business area models into an intermediate model, wherein each intermediate model is represented using a substantially similar meta-modeling language; and generate the semantic business model by merging the set of intermediate models.

An eighth aspect of the invention provides a business method for generating and/or managing a semantic business model, the business method comprising managing a computer infrastructure that performs the process described herein; and receiving payment based on the managing.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

As indicated above, the invention provides a computer-implemented solution for managing a semantic business model. In particular, one or more business area models for a business entity are obtained and transformed into intermediate model(s). Each intermediate model is represented using a substantially similar meta-modeling language. Subsequently, the semantic business model is generated by merging the set of intermediate models. In this manner, the semantic business model can be generated in a manner that reduces the overall burden (e.g., expertise, knowledge, decision-making, time, and/or the like) on a user, such as a business consultant. Further, the semantic business model can be more detailed and/or comprise a larger scale than those currently generated manually. The semantic business model can be provided for display to a user and/or use in performing qualitative analysis on various aspects of the business entity.

Figure 1:
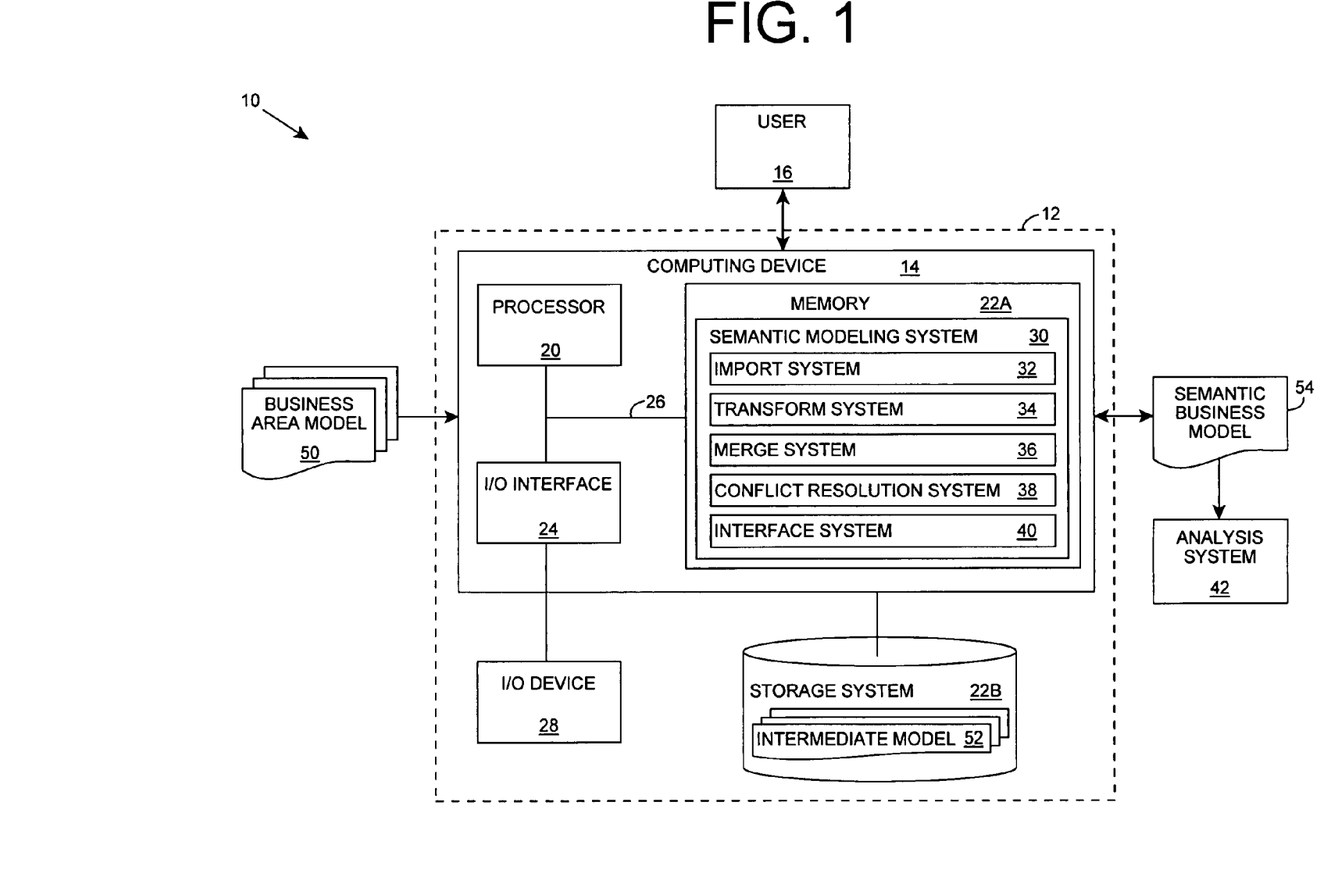
FIG. 1 shows an illustrative environment for managing a set of semantic business models according to an embodiment of the invention.

Turning to the drawings, FIG. 1 shows an illustrative environment 10 for managing a set (one or more) of semantic business models, such as semantic business model 54. To this extent, environment 10 includes a computer infrastructure 12 that can perform the process described herein for managing semantic-business model 54. In particular, computer infrastructure 12 is shown including a computing device 14 that comprises a semantic modeling system 30, which makes computing device 14 operable to manage semantic business model 54 by performing the process described herein.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as semantic modeling system 30, that is stored in memory 22A and/or storage system 22B. While executing computer program code, processor 20 can read and/or write data, such as one or more business area models 50, to/from memory 22A, storage system 22B, and/or I/O interface 24. Bus 26 provides a communications link between each of the components in computing device 14. I/O device 28 can comprise any device that enables a user 16 to interact with computing device 14 or any device that enables computing device 14 to communicate with one or more other computing devices, such as analysis system 42.

In any event, computing device 14 can comprise any general purpose computing article of manufacture capable of executing computer program code installed thereon (e.g., a personal computer, server, handheld device, etc.). However, it is understood that computing device 14 and semantic modeling system 30 are only representative of various possible equivalent computing devices that may perform the process described herein. To this extent, in other embodiments, the functionality provided by computing device 14 and semantic modeling system 30 can be implemented by a computing article of manufacture that includes any combination of general and/or specific purpose hardware and/or computer program code. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over any type of wired and/or wireless communications link, such as a network, a shared memory, or the like, to perform the process described herein. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

As discussed further herein, semantic modeling system 30 enables computing infrastructure 12 to manage a set of semantic business models 54. To this extent, semantic modeling system 30 is shown including an import system 32, a transform system 34, a merge system 36, a conflict resolution system 38, and an interface system 40. Operation of each of these systems is discussed herein. However, it is understood that some of the various systems shown in FIG. 1 can be implemented independently, combined, and/or stored in memory for one or more separate computing devices that are included in computer infrastructure 12. Further, it is understood that some of the systems and/or functionality may not be implemented, and/or additional systems and/or functionality may be included as part of computing infrastructure 12.

Regardless, the invention provides a solution for managing semantic business model(s) 54. For example, semantic modeling system 30 can generate a new semantic business model 54 based on one or more business area models 50 and/or another semantic business model 54. To this extent, import system 32 can obtain a set (one or more) of business area models 50 and/or a previous semantic business model 54 for a business entity. As used herein, the term "business entity" means any organization that performs some business function (e.g., a corporation, an educational institution, a not-for-profit organization, etc.). Further, each business area model 50 can comprise a business model for a particular area (e.g., department) of the business entity. For example, business area model 50 could comprise an organization chart for a human resources department, a business activity model, a model of information technology (IT) solutions/capabilities, a structure of key performance indicators (KPIs), etc. A previous semantic business model 54 can comprise a partially completed semantic business model 54 for the business entity and/or a generic/default semantic business model 54 that is selected based on a type of business entity, a domain (e.g., field of business) for the business entity, and/or the like.

Figure 2:
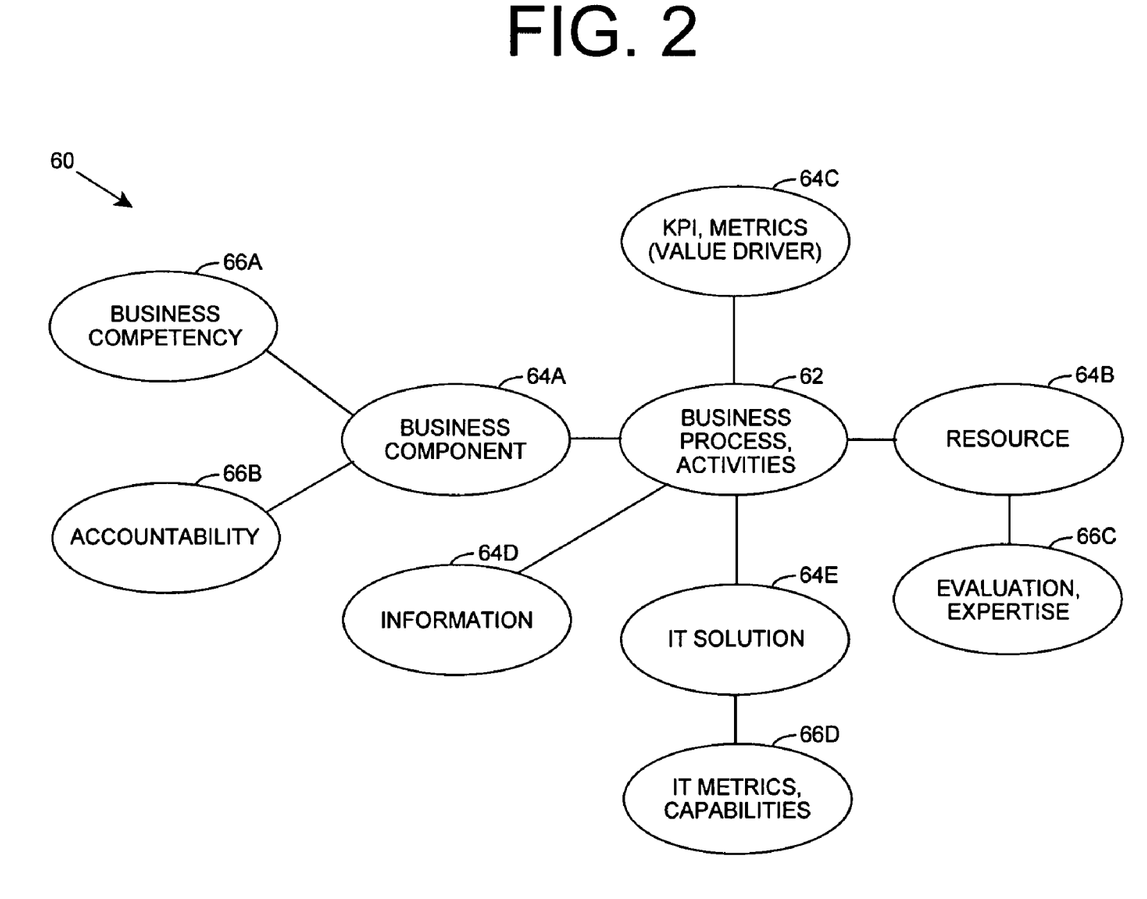
FIG. 2 shows an illustrative metamodel for a semantic business model according to an embodiment of the invention.

In general, semantic business model 54 includes various classes, such as business components, business activities, KPIs, business processes, value drivers, and the like, as well as the relationships between the classes. FIG. 2 shows an illustrative metamodel 60 for semantic business model 54 (FIG. 1) according to an embodiment of the invention. Metamodel 60 includes a business process/activities class 62 that has various other classes related thereto. In particular, metamodel 60 includes a business component class 64A, a resource (e.g., human, facility, and the like) class 64B, a KPI/metrics (value driver) class 64C, an information class 64D, an IT solution class 64E, etc. Each of the related classes 64A-E can further include one or more related metrics and/or attributes. For example, business component class 64A can include a related business competency metric 66A and an accountability (e.g., a level such as executive, management, staff member, etc.) metric 66B, resource class 64B can include a related evaluation/expertise metric 66C, and IT solution class 64E can include a related IT metrics/capabilities metric 66D. It is understood that metamodel 60 is only illustrative, and other embodiments of metamodel 60 can include various alternative class, metric and/or relationship configurations as will be recognized by one in the art.

Returning to FIG. 1, import system 32 can obtain business area model(s) 50 and/or semantic business model(s) 54 using any known solution. For example, import system 32 can generate an interface that enables a user 16 to selectively provide business area model(s) 50 to import system 32. Alternatively, another system (not shown) can communicate business area model(s) 50 and/or semantic business model(s) 54 to import system 32 using an application programming interface (API), or the like. Still further, import system 32 can enable user 16 to create and/or edit business area model(s) 50 and/or semantic business model 54 in a known manner.

In any event, transform system 34 can transform each business area model 50 and/or semantic business model 54 into one or more intermediate models 52, each of which is represented using a substantially similar and/or identical meta-modeling language. In particular, business area models 50 may be defined using various file storage formats (e.g., spreadsheet, word processor, database, etc.) and/or modeling languages, such as unified modeling language (UML), extensible markup language (XML), an entity relationship (ER) model, resource description framework (RDF), OWL web ontology language, etc. To this extent, transform system 34 can transform the data for each business area model 50 and/or semantic business model 54 into an intermediate model 52 that stores the data using a substantially similar and/or identical representation as all other intermediate model(s) 52.

Figure 3:
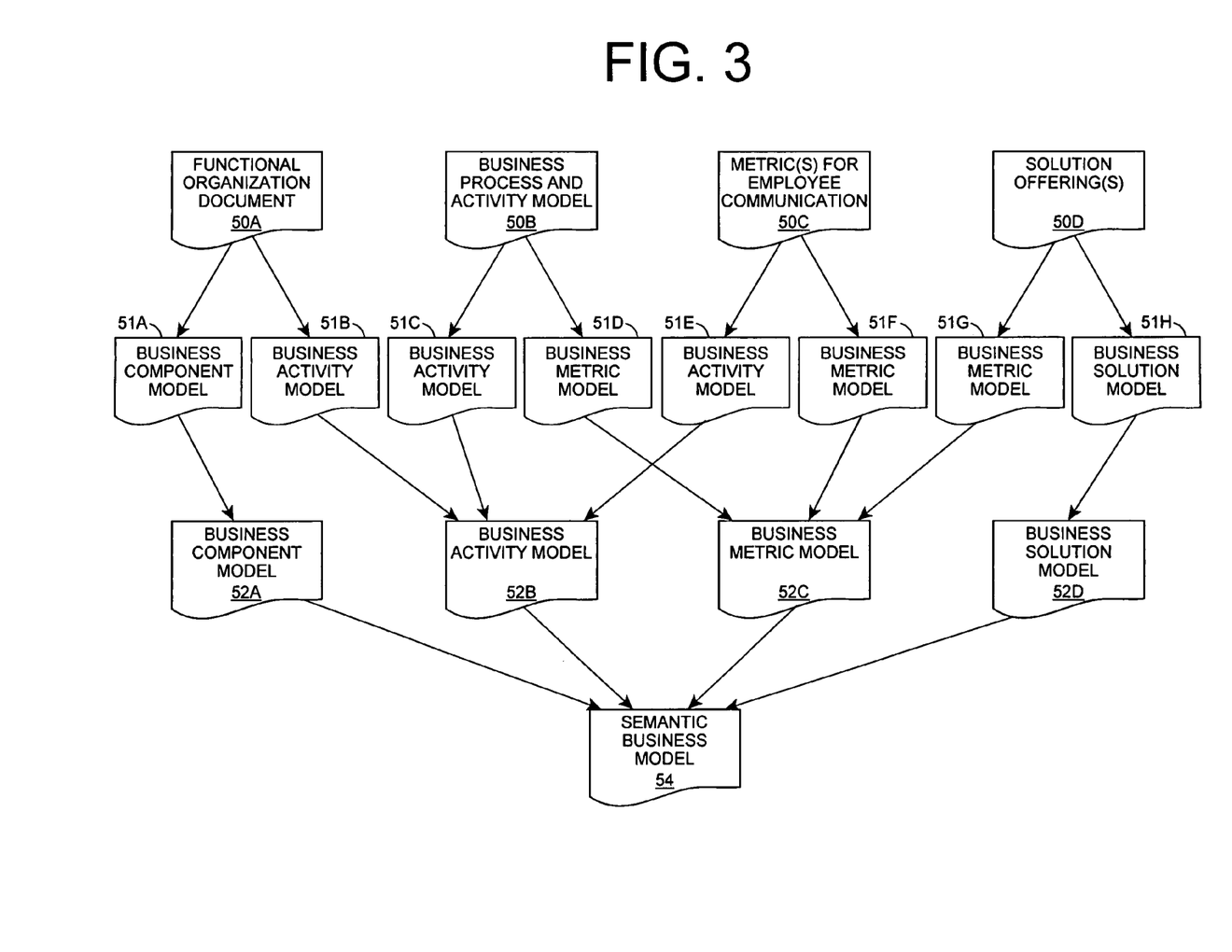
FIG. 3 shows an illustrative data flow diagram for generating a semantic business model according to an embodiment of the invention.

In one embodiment, the transformation of each business area model 50 into an intermediate model 52 is done in two phases. In particular, transform system 34 extracts one or more business area sub-models from each business area model 50, which merge system 36 merges into one or more intermediate models 52. For example, FIG. 3 shows an illustrative data flow diagram for generating semantic business model 54 according to an embodiment of the invention. Referring to FIGS. 1 and 3, transform system 34 can generate one or more business area sub-models 51A-H based on a plurality of business area models 50A-D. In one embodiment, the types of business area sub-models 51A-H can be limited to particular types of information conveyed by business area models 50A-D. For example, transform system 34 and/or a user 16 (FIG. 1) using transform system 34 can identify and/or isolate business component information, business activity information, business metric information, and/or business solution information from each business area model 50A-D. The corresponding information can then be stored in a business area sub-model 51A-H. Subsequently, merge system 36 can merge business area sub-models 51A-H of the same type into intermediate models 52A-D using the mapping solution(s) discussed herein. Merge system 36 can then use intermediate models 52A-D to generate semantic business model 54.

Transform system 34 can transform each business area model 50A-D and/or business area sub-model 51A-H into any desired meta-modeling language. In one embodiment, transform system 34 uses a meta-modeling language, such as the meta object facility (MOF) object model as defined by the Object Management Group (OMG). In another embodiment, the meta-modeling language comprises the Eclipse Modeling Framework (EMF). In the latter case, each business area sub-model 51A-H and/or intermediate model 52A-D can be represented using EMF objects in the Java programming language. Subsequently, merge system 36 merges each intermediate model 52A-D into semantic business model 54. Semantic business model 54 can be represented using any desired language/framework. In one embodiment, semantic business model 54 is represented using a semantic markup language, such as the OWL web ontology language. In this case, semantic business model 54 facilitates inferences, query execution, and the like, for use in performing a qualitative analysis of semantic business model 54.

Figure 4:
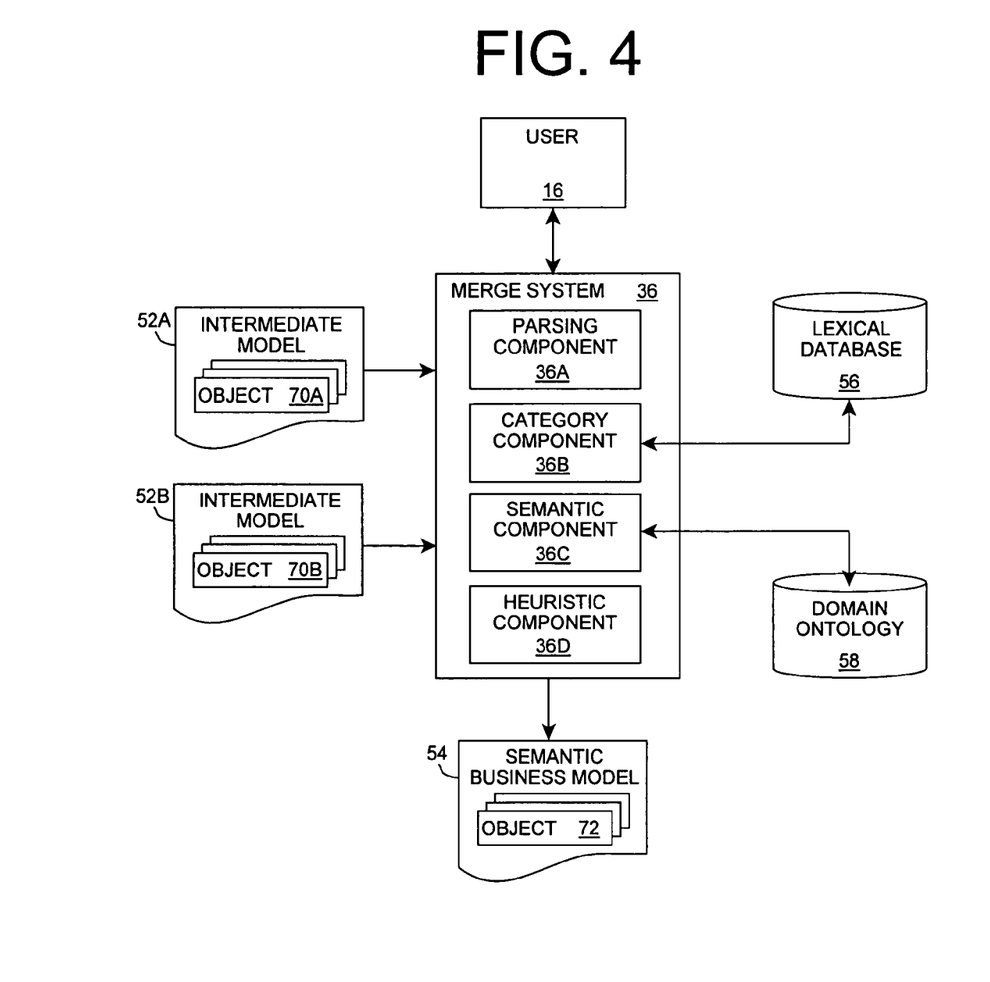
FIG. 4 shows a more detailed view of the merge system of FIG. 1 according to an embodiment of the invention.

FIG. 4 shows a more detailed view of merge system 36 according to an embodiment of the invention. In general, merge system 36 generates semantic business model 54 by merging the set of intermediate models 52A-B. In particular, merge system 36 automatically identifies objects (e.g., classes) 70A-B and/or relationships in intermediate model(s) 52A-B, and adds them to semantic business model 54. To this extent, merge system 36 can add objects 72 and their corresponding relationship information to semantic business model 54 based on objects 70A-B and their corresponding relationship information in each intermediate model 52.

Frequently, two or more intermediate models 52A-B will each include one or more objects 70A-B that can be correlated. To this extent, merge system 36 can map a first object 70A in a first intermediate model 52A to a similar/identical second object 70B in a second intermediate model 52B. In particular, merge system 36 can generate and add a mapping object 72 to semantic business model 54 that represents both the first and second objects 70A-B. Subsequently, merge system 36 can add the relationship information for the mapping object 72 to semantic business model 54 based on the relationship information for each object 70A-B in the corresponding first and second intermediate models 52A-B.

To map two or more objects 70A-B to a single object 72, merge system 36 can determine all objects 70A-B that are identified the same (e.g., "router 1234") as mapping to one another. However, it is desirable that merge system 36 also be able to map objects 70A-B that represent the same component/functionality but are not identically identified. To this extent, merge system 36 also can use one or more matching solutions to map objects 70A-B in different intermediate models 52A-B to one another.

Initially, a parsing component 36A can parse multi-term attributes of each object 70A-B into tokens, and perform part-of-speech tagging and stop-word filtering on each token. In order to translate attributes into tokens, parsing component 36A can exploit commonly used naming conventions. For example, word boundaries in a multi-term attribute can be detected by a change in font (e.g., capitalized letter to convert CustomerPurchase into Customer and Purchase), the presence of a delimiter (e.g., underscore, space, alphabetical to numeric transition, etc.), and/or the like. Additionally, parsing component 36A can apply grammar rules, perform stop-word filtering using, for example, a pre-supplied list of common stop words (e.g., and, or, the, etc.).

Further, parsing component 36A can expand any abbreviations included in the tokens. In this case, parsing component 36A can use a domain-specific and/or a domain-independent vocabulary to determine an appropriate expansion of an abbreviation. Should a word include multiple possible expansions, e.g., Cust could expand to Customer or Customary, parsing component 36A can maintain both expansions for subsequent processing. Still further, parsing component 36A can include context information for each token in an object 70A-B. For example, a token generated from an operation name can include operation context information, a token generated from a message can include message context information, etc.

After parsing, a category component 36B can categorically match two or more objects 70A-B using a lexical database 56. Lexical database 56 comprises a taxonomy of words and can comprise an existing taxonomy, such as Princeton University's WordNet™ taxonomy. To this extent, lexical database 56 can comprise a hierarchical structure that organizes words into synonym sets, each of which represents an underlying lexical concept. In one embodiment, category component 36B can find any synonym(s) for the various tokens in each object 70A-B using lexical database 56. Each synonym can be assigned a similarity score based on a sense index and an order of the synonym in the matching synonym(s) in lexical database 56. In this manner, category component 36B can match two or more objects 70A-B based on a distance that their corresponding identifiers are from one another in lexical database 56. For example, when two or more objects 70A-B are identified by words (tokens) that are sufficiently close (e.g., one is sub-category of the other, both in same sub-category, or the like) to one another in lexical database 56, category component 36B can generate a single mapping object 72 for all of the objects 70A-B.

Merge system 36 also can include a semantic component 36C for semantically matching two or more objects 70A-B using a domain ontology 58. Domain ontology 58 can comprise an ontology, e.g., a hierarchical classification of knowledge, for a domain in which a business entity performs business activities. For example, domain ontology 58 can comprise an ontology for the petroleum industry when the business entity performs petroleum-related business activities. In any event, domain ontology 58 can define various types of relationships between business entities. In one embodiment, domain ontology 58 defines four types of relationships, e.g., subClassOf (A, B), superClassOf (A, B), type (A, B), and equivalenceClass (A, B) can be defined in which A and B are two concepts within the particular domain. It is understood that these relationships are only illustrative, and numerous types and/or combinations of relationships can be defined for a particular ontology.

Regardless, when two or more objects 70A-B are categorized sufficiently close in domain ontology 58, semantic component 36C can generate a single mapping object 72 for all of the objects 70A-B. To categorize each object 70A-B, semantic component 36C can query domain ontology 58 for each attribute (token) for each object 70A-B. The matches returned will comprise a set of related concepts along with distance scores that represent a distance between two concepts. Semantic component 36C can use a scoring scheme to compute the distance between related concepts in domain ontology 58. For example, a query performed for "DueDate" could return an ontologically matching concept, such as "DeliveryDate", while a query for "UPC" may return related concepts such as "EAC code" and "Part Number" using inferences in domain ontology 58.

Further, merge system 36 can include a heuristic component 36D for heuristically mapping objects 70A-B using at least one other mapping of related objects 70A-B. For example, heuristic component 36D can perform a position-based heuristic mapping. In this case, heuristic component 36D can use a mapping of an object 70A to object 70B to also map a neighboring object of object 70A to object 70B. It is understood that position-based heuristic mapping is only illustrative, and other types of heuristic mappings can be used under the invention.

When merge system 36 uses two or more matching solutions for mapping objects 70A-B, a conflict may occur when multiple mappings are identified for an object 70A-B by different matching solutions. For example, category component 36B could map object 70A to object 70B, while semantic component 36C could map object 70A to another object in intermediate model 52B. Returning to FIG. 1, to address this situation, semantic modeling system 30 can comprise a conflict resolution system 38. Conflict resolution system 38 can resolve conflicts between two or more mappings in semantic business model 54. In one embodiment, conflict resolution system 38 can rank the mappings based on at least one attribute of each object 70A-B (FIG. 4) and/or the matching solution that generated each mapping. For example, based on a type of the object and/or text of the object (e.g., such as text mining, information retrieval, or the like, commonly used in Internet search engine technology), one matching solution may be more accurate than another matching solution. In this case, conflict resolution system 38 can rank the mapping generated by the more accurate matching solution higher, and use it over the other mapping(s).

Further, conflict resolution system 38 can provide the conflict for analysis by user 16. For example, conflict resolution system 38 can generate a display that enables user 16 to select which, if any, mapping is correct. Subsequently, conflict resolution system 38 can use the selected mapping. In this case, conflict resolution system 38 can use a machine learning technique or the like, to adjust the operation of merge system 36 and/or conflict resolution system 38 for the generation of subsequent semantic business model(s) 54. For example, conflict resolution system 38 can adjust its ranking of the matching solutions, adjust one or more mapping rules used in merge system 36, and/or the like. It is understood that the adjustments can be made in a domain-specific and/or domain-neutral manner.

Once semantic business model 54 has been generated, semantic modeling system 30 can store it and manage various operations performed on semantic business model 54. For example, interface system 40 can generate a user interface that enables user 16 to view and/or modify semantic business model 54. Additionally, interface system 40 can provide semantic business model 54 for use by an analysis system 42. In this case, interface system 40 can enable analysis system 42 to access and/or copy semantic business model 54, interface system 40 can provide semantic business model 54 to analysis system 42 in response to a request, and/or the like. In any event, analysis system 42 can perform qualitative analysis on semantic business model 54. For example, analysis system 42 can comprise a value modeling system as described in the previously incorporated co-owned and co-pending U.S. patent application Ser. No. 11/200,847.

Figure 5:
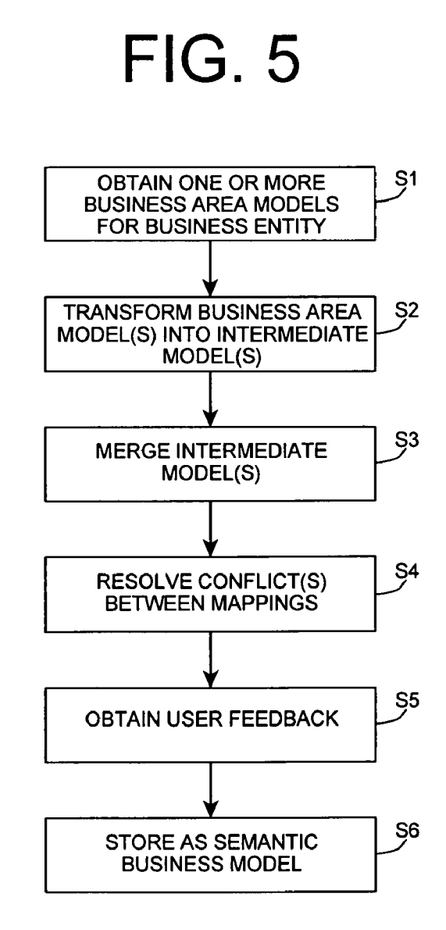
FIG. 5 shows an illustrative process for generating a semantic business model according to an embodiment of the invention.

As discussed herein, the invention provides a method of generating and/or managing semantic business model 54. To this extent, FIG. 5 shows an illustrative process for generating a semantic business model according to an embodiment of the invention. Referring to FIGS. 1 and 5, in step S1, import system 32 obtains one or more business area models 50 and/or semantic business models 54 for a business entity. In step S2, transform system 34 transforms business area model(s) 50 into one or more intermediate model(s) 52. In step S3, merge system 36 merges the intermediate models 52 into semantic business model 54. In step S4, conflict resolution system 38 resolves any conflicts between mappings generated by merge system 36. In step S5, conflict resolution system 38 can further obtain feedback from user 16, e.g., selection of one of multiple possible mappings, correction of mappings, etc. In step S6, semantic modeling system 30 can store semantic business model 54 for future access and/or use by user 16 and/or an analysis system 42. It is understood that the process shown in FIG. 5 is only illustrative and various alterations are possible. To this extent, additional steps can be included, the steps can be repeated, combined, performed in a different order, and/or the like, as will be recognized by one in the art.

The invention described herein is now further discussed with reference to an illustrative usage scenario. In particular, commonly, a business consultant would like to answer questions such as: "What part(s) of my client's business will be impacted by implementing an Internet Protocol-based Voice-over-IP (VOIP) solution?", "Which business driver(s) in my client's business will be impacted by implementing an integrated production and supply solution?", "Which existing solution should be recommended to the client given that the client would like to improve its response times in customer problem resolutions?", and/or the like. To date, the business consultant is required to painstakingly interview the client to gather information about how the company is organized, what metrics are important to the particular business problem at hand, what drives those metrics, etc., to propose a solution to improve the client's business. If the solution is implemented in computer software and/or hardware, the business consultant also needs knowledge about the ever-changing landscape of hardware and/or software solutions, and the corresponding business metrics these solutions improve.

In many cases, much of the information that the business consultant needs to gather about the client and about possible solutions is available in the company, but is located in many places and/or in many formats. For example, a client may have information about the organization of the company, key performance indicator(s), etc., in a document such as an annual report. The client also may have detailed metrics that are measured for specific business areas in one or more databases or spreadsheets, which are separately managed by an administrator for the corresponding business function. Similarly, the business consultant's company may maintain marketing material that indicates the various solution offerings and the corresponding types of business metrics that each improves. Further, an industry standards body may publish documents that present typical business processes, the related activities in a business process, and/or the metrics for measuring the performance of those business activities. In summary, information that the business consultant needs is distributed in multiple places and in multiple formats, thereby making it difficult for the business consultant to gather and assimilate the information.

To date, the business consultant is required to gather the above-mentioned types of information from multiple sources, assimilate it, conduct qualitative as well as quantitative analyses on the specific business problems presented by the client, and provide recommendations. Interviewing, data gathering and data assimilation are the most time consuming part of this process. Once the data is gathered and the corresponding connections are made between various business processes, the underlying activities, their performance metrics, and the solution offerings, the business consultant often is able to conduct the analyses and present recommendation(s) in a relatively short period of time. Subsequently, the gathered information is retained in informal forms, such as documents, spreadsheets and/or presentations, thereby making it difficult to reuse for other similar engagements.

Returning to FIG. 1, the invention automates/semi-automates the data assimilation process to aid the business consultant (e.g., user 16). Further, the information can be retained in a formal semantic business model 54 (FIG. 1) for subsequent reuse. In particular, when a business consultant seeks to assess the impact of a VOIP solution on a particular business entity, the business consultant will interview one or more individuals at the business entity. In general, the business consultant will determine how the business entity is organized, the type of phone technology currently used, metrics the entity uses to measure communication effectiveness, etc. The business consultant and/or client may locate such information in: an internal document that contains the entity's organizational information, a document in XML format from an external source (such as a standards body) outlining the business processes and activities that involve human communication, and a spreadsheet containing the metrics measuring the performance of the current phone technology. Additionally, the business consultant's company may have a spreadsheet that outlines the solutions that are offered and the benefits of implementing those solutions. In this case, there are four different sources of information that the business consultant is required to gather and assimilate.

The business consultant can build a semantic business model 54 that connects the various business metrics with business activities/components and solutions to answer the particular question (e.g., the impact of implementing a VOIP solution). Referring to FIGS. 1 and 3 as an illustrative example, user 16 (e.g., the business consultant) can use import system 32 to obtain the business area models 50A-D. Subsequently, user 16 can use transform system 34 to transform each business area model 50A-D into one or more business area sub-models 51A-H, which are represented using the same meta modeling language, such as the OWL ontology modeling language.

Once business area sub-models 51A-H have been generated, user 16 can use merge system 36 to merge the various models 51A-H into a set of intermediate models 52A-D. The merging can accommodate possible overlap in the business area sub-models 51A-H. For example, an internal document may contain the entity's organizational information as well as information about metrics for measuring the performance of current phone technology, which may overlap with information in a second source, e.g., a spreadsheet containing the metrics that measure the performance of the current phone technology. Consequently, merge system 36 merges business area sub-models 51A-H to ensure that a single intermediate model 52A-D includes all the information related to one aspect (e.g., metric). Merge system 36 can use key word matching as discussed herein to merge business area sub-models 51A-H into intermediate models 52A-D. Regardless, merge system 36 can match each object in one business area sub-models 51A-H with all of the objects in other business area sub-model(s) 51A-H using lexical matching, synonym matching and/or the like. Merge system 36 notes related objects and places them in a single intermediate model 52A-D.

When merge system 36 detects one or more conflicts in the matching, conflict resolution system 38 can resolve the conflict(s). For example, conflict resolution system 38 can present each conflict to user 16 and enable user 16 to decide the appropriate matching. In any event, merge system 36 and/or conflict resolution system 38 will generate an intermediate model 52A-D for each type of information. Continuing with the VOIP scenario, the resulting intermediate models 52A-D will include: an intermediate model 52A that comprises a set of business objects (e.g., IT investments, HR management, facilities operation and maintenance, etc.) for the business entity; an intermediate model 52B that comprises a set of business activity objects that are associated with employee communication process (manage employee productivity, manage IT projects, manage, test, evaluate and deploy IT infrastructure, etc.); an intermediate model 52C that comprises a set of business metric objects for measuring the performance of employee communication (such as IT staff costs, Intra company employee travel costs, intra company employee travel for education etc.); and an intermediate model 52D that comprises a set of solution objects that are related to VOIP solutions (such as IP convergence solution with remote management, IP convergence solution without remote management, supply chain planning solution, etc.).

In any event, merge system 36 can merge intermediate models 52A-D into semantic business model 54. In particular, merge system 36 can map/associate various objects in one intermediate model 52A-D with those in another. For example, merge system 36 can map/associate a facilities operation and maintenance object in intermediate model 52A with an IT staff costs object in intermediate model 52C, which merge system 36 can map/associate with a manage IT projects object in intermediate model 52B, and which merge system 36 can map/associate with both an IP convergence solution with remote management object and an IP convergence solution without remote management object in intermediate model 52D. Merge system 36 can map/associate the various objects with or without the interaction of user 16 based on, for example, common keywords matched using the matching solution(s) described herein in the descriptions associated with each object.

User 16 can be involved in each stage of the mapping to validate the models being generated and/or resolve any conflicts. The resulting mappings/associations are stored in semantic business model 54. The business map that is represented in semantic business model 54 can be stored using a semantic markup language such as OWL, which enables queries. For example, semantic business model 54 can be queried to obtain a response to the query "What part(s) of my client's business will be impacted by implementing a VOIP solution?" In the illustrative scenario described herein, the answer would be the facilities operation and maintenance component of the business. Further, semantic business model 54 can be used to determine that the VOIP solution will impact the manage IT costs business activity, which will result in an impact to the IT staff costs metric as well.

The scenario discussed herein is only illustrative. When implemented, the invention can be used to in other more or less complex situations in which understanding the interplay of the impact of a particular business decision on all parts of a business is important. For example, a solution that optimizes production planning alone may improve operational metrics, but may adversely impact customer satisfaction-related metrics. While some of the interplay may be obvious, the details of which business area(s) get impacted due to certain business decisions can be quite involved. As a result, semantic business model 54 will assist consultants and business decision makers in conducting what-if scenarios and other qualitative experiments relatively easily, thereby saving time and money for the business.

While shown and described herein as a method and system for managing/generating semantic business model(s) 54 (FIG. 1), it is understood that the invention further provides various alternative embodiments. For example, in one embodiment, the invention provides a program product stored on a computer-readable medium, which when executed, enables a computer infrastructure to manage and/or generate semantic business model 54. To this extent, the computer-readable medium includes program code, such as semantic modeling system 30 (FIG. 1), that implements the unique process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process described herein on a subscription, advertising, and/or fee basis. That is, a service provider, such as an Application Service Provider, could offer to manage and/or generate semantic business model(s) 54 (FIG. 1) as described herein. In this case, the service provider can manage (e.g., create, maintain, support, etc.) a computer infrastructure, such as computer infrastructure 12 (FIG. 1), that performs the process described herein for one or more customers. In return, the service provider can receive payment from the customer(s) under a subscription and/or fee agreement and/or the service provider can receive payment from the sale of advertising to one or more third parties.

In still another embodiment, the invention provides a method of generating a system for managing and/or generating semantic business model(s) 54 (FIG. 1). In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer-implemented method of generating a semantic business model, the method comprising:
    transforming each business area model of a plurality of business area models for a business entity into a set of intermediate models using at least one of a set of processors, wherein each business area model is a business model for a particular area of the business entity, and wherein each intermediate model stores data for at least one corresponding business area model in a meta-modeling language that is the same for each intermediate model, the data including at least one of: business component information, business activity information, business metric information, or business solution information; and
    merging the set of intermediate models into the semantic business model using at least one of the set of processors, wherein the semantic business model contains objects and relationship information for the objects identified from the set of intermediate models, by:
        generating a first set of tokens for an object in a first intermediate model and a second set of tokens for an object in a second intermediate model, each token corresponding to a term in an attribute for the corresponding object, wherein the first and second set of tokens are generated by parsing the attribute for the corresponding object into terms by performing at least one of the following: determining word boundaries in the attribute, expanding abbreviations in the attribute, or determining the context information for each term in the attribute;
        mapping the object in the first intermediate model to the object in the second intermediate model based on a correlation between a token in the first set of tokens and a token in the second set of tokens;
        adding a mapping object to the semantic business model configured to represent both of the objects; and
        adding relationship information for the mapping object to the semantic business model based on the relationship information for each object in the first intermediate model and the second intermediate model.

2. The method of claim 1, wherein the mapping includes categorically matching the tokens using a lexical database comprising a taxonomy of words that organizes words into synonym sets, each synonym set representing an underlying lexical concept.

3. The method of claim 1, wherein the mapping includes semantically matching the tokens using an ontology of a domain for the business entity, the ontology comprising a hierarchical classification of knowledge for the domain.

4. The method of claim 1, wherein the mapping includes heuristically mapping the objects using at least one other mapping of objects between the first and second intermediate models, wherein the objects in the at least one other mapping are related to the heuristically mapped objects based on a heuristic mapping.

5. The method of claim 1, wherein the merging further includes resolving a conflict between at least two mappings in the semantic business model.

6. The method of claim 5, wherein the resolving includes obtaining a modification to the semantic business model from a user.

7. The method of claim 6, further comprising adjusting the merging for a subsequent semantic business model based on the modification.

8. The method of claim 5, wherein the resolving includes ranking the at least two mappings based on at least one attribute of each corresponding at least one object.

9. The method of claim 1, wherein the transforming includes:
    extracting a set of business area sub-models from each business area model of the plurality of business area models; and
    merging the sets of business area sub-models into the set of intermediate models.

10. The method of claim 9, wherein each business area sub-model has a corresponding type, and wherein the merging merges each business area sub-model having the same type into a single intermediate model for the type.

11. A computer-implemented method of managing a semantic business model, the method comprising:
  transforming each business area model of a plurality of business area models for a business entity into a set of intermediate models using at least one of a set of processors, wherein each business area model is a business model for a particular area of the business entity, and wherein each intermediate model stores data for at least one corresponding business area model in a meta-modeling language that is the same for each intermediate model, and wherein the transforming includes:
    extracting a set of business area sub-models from each business area model of the plurality of business area models; and
    merging the sets of business area sub-models into the set of intermediate models; and
  generating the semantic business model by merging the set of intermediate models using at least one of the set of processors, wherein merging the set of intermediate models includes:
    automatically identifying objects in the intermediate models and relationships for the objects, wherein the relationships for the objects are determined by parsing an attribute for a corresponding object into terms by performing at least one of the following: determining word boundaries in the attribute, expanding abbreviations in the attribute, or determining the context information for each term in the attribute, such that there is a relationship if there is a correlation between terms; and
    adding objects and relationship information for the objects identified from the set of intermediate models to the semantic business model.

12. The method of claim 11, wherein the merging includes mapping a first object in a first intermediate model to a second object in a second intermediate model.

13. The method of claim 12, wherein the merging further includes resolving a conflict between at least two mappings in the semantic business model.

14. The method of claim 12, wherein the mapping includes categorically matching objects using a lexical database.

15. The method of claim 12, wherein the mapping includes semantically matching objects using an ontology of a domain for the business entity.

16. The method of claim 12, wherein the mapping includes heuristically mapping objects using at least one other mapping of objects.

17. The method of claim 11, further comprising providing the semantic business model to use by an analysis system.

18. A computerized system for managing a semantic business model, the system comprising:
  at least one computing device including:
    a system configured to transform each business area model of a plurality of business area models for a business entity into a set of intermediate models, wherein each business area model is a business model for a particular area of the business entity, and wherein each intermediate model stores data for at least one corresponding business area model in a meta-modeling language that is the same for each intermediate model, and wherein the system configured to transform includes:
      a system configured to extract a set of business area sub-models from each business area model of the plurality of business area models; and
      a system configured to merge the sets of business area sub-models into the set of intermediate models; and
    a system configured to generate the semantic business model by merging the set of intermediate models, wherein system configured to merge includes:
      a system configured to automatically identify objects in the intermediate models and relationships for the objects, wherein the relationships for the objects are determined by parsing an attribute for a corresponding object into terms by performing at least one of the following: determining word boundaries in the attribute, expanding abbreviations in the attribute, or determining the context information for each term in the attribute, such that there is a relationship if there is a correlation between terms; and
      a system configured to add the objects and relationship information for the objects identified from the set of intermediate models to the semantic business model.

19. The system of claim 18, wherein the system configured to generate includes a system configured to map a first object in a first intermediate model to a second object in a second intermediate model.

20. The system of claim 19, wherein the system configured to generate further includes a system configured to resolve a conflict between at least two mappings in the semantic business model.

21. The system of claim 19, wherein the system configured to map includes a system configured to categorically match objects using a lexical database.

22. The system of claim 19, wherein the system configured to map includes a system configured to semantically match objects using an ontology of a domain for the business entity.

23. The system of claim 19, wherein the system configured to map includes a system configured to heuristically map objects using at least one other mapping of objects.

24. The system of claim 18, the at least one computing device further including a system configured to provide the semantic business model for use by an analysis system.

25. The system of claim 18, wherein the semantic business model is represented using a semantic markup language.

26. A program product comprising computer program code stored on an electronic storage medium, which when executed, enables a computer infrastructure including at least one processor to implement a method of managing a semantic business model, the method comprising:
  transforming each business area model of a plurality of business area models for a business entity into a set of intermediate models, wherein each business area model is a business model for a particular area of the business entity, and wherein each intermediate model stores data for at least one corresponding business area model in a meta modeling language that is the same for each intermediate model, and wherein the transforming includes:
    extracting a set of business area sub-models from each business area model of the plurality of business area models; and
    merging the sets of business area sub-models into the set of intermediate models; and
  generating the semantic business model by merging the set of intermediate models, wherein merging the set of intermediate models includes:
    automatically identifying objects in the intermediate models and relationships for the objects, wherein the relationships for the objects are determined by parsing an attribute for a corresponding object into terms by performing at least one of the following: determining word boundaries in the attribute, expanding abbreviations in the attribute, or determining the context information for each term in the attribute, such that there is a relationship if there is a correlation between terms; and adding objects and relationship information for the objects identified from the set of intermediate models to the semantic business model.

27. The program product of claim 26, wherein the merging includes mapping a first object in a first intermediate model to a second object in a second intermediate model.

28. The program product of claim 27, wherein the merging further includes resolving a conflict between at least two mappings in the semantic business model.

29. The program product of claim 27, wherein the mapping includes categorically matching objects using a lexical database.

30. The program product of claim 27, wherein the mapping includes semantically matching objects using an ontology of a domain for the business entity.

31. The program product of claim 27, wherein the mapping includes heuristically mapping objects using at least one other mapping of objects.

32. The program product of claim 26, wherein the method further comprises providing the semantic business model for use by an analysis system.

33. A method of generating a system for managing a semantic business model, the method comprising:

providing a computer infrastructure including at least one processor configured to:

transform each business area model of a plurality of business area models for a business entity into a set of intermediate models, wherein each business area model is a business model for a particular area of the business entity, and wherein each intermediate model stores data for at least one corresponding business area model in a meta-modeling language that is the same for each intermediate model, and wherein the transforming includes:

extracting a set of business area sub-models from each business area model of the plurality of business area models; and merging the sets of business area sub-models into the set of intermediate models; and generate the semantic business model by merging the set of intermediate models, wherein merging the set of intermediate models includes:

automatically identifying objects in the intermediate models and relationships for the objects, wherein the relationships for the objects are determined by parsing an attribute for a corresponding object into terms by performing at least one of the following: determining word boundaries in the attribute, expanding abbreviations in the attribute, or determining the context information for each term in the attribute, such that there is a relationship if there is a correlation between terms; and adding objects and relationship information for the objects identified from the set of intermediate models to the semantic business model.

* * * * *